United States Patent [19]

Naudin

[11] Patent Number: 4,690,259

[45] Date of Patent: Sep. 1, 1987

[54] CLUTCH COVER ASSEMBLY

[75] Inventor: Jacky Naudin, Asnieres, France

[73] Assignee: Valeo, Paris, France

[21] Appl. No.: 733,190

[22] Filed: May 13, 1985

[30] Foreign Application Priority Data

May 18, 1984 [FR] France .................. 84 07742

[51] Int. Cl.$^4$ ............................................. F16D 13/69
[52] U.S. Cl. .................. 192/70.28; 192/89 B;
192/109 R
[58] Field of Search ............ 192/70.18, 70.28, 109 R,
192/89 B

[56] References Cited

U.S. PATENT DOCUMENTS

| 2,248,378 | 7/1941 | Nutt ................................ 192/70.18 |
| 2,253,344 | 8/1941 | Nutt et al. ....................... 192/70.18 |
| 2,277,557 | 3/1942 | Nutt ...................................... 192/68 |
| 3,489,256 | 1/1970 | Binder et al. ............... 192/70.18 X |
| 4,558,771 | 12/1985 | Despres ........................... 192/70.18 |

FOREIGN PATENT DOCUMENTS

| 2658744 | 7/1978 | Fed. Rep. of Germany . |
| 2342427 | 9/1977 | France . |
| 2437525 | 4/1980 | France . |
| 2528925 | 12/1983 | France . |
| 2528926 | 12/1983 | France . |
| 1266824 | 3/1972 | United Kingdom . |
| 2032017 | 4/1980 | United Kingdom . |
| 1578450 | 11/1980 | United Kingdom . |
| 1592874 | 7/1981 | United Kingdom . |
| 2098287 | 11/1982 | United Kingdom . |

Primary Examiner—George H. Krizmanich
Attorney, Agent, or Firm—Charles E. Brown; Charles A. Brown

[57] ABSTRACT

A clutch cover assembly is adapted to rotate about an axis in one direction only. It comprises a cover formed with radial openings bordered circumferentially by axially offset fixing and retaining lugs. Tabs on a pressure plate pass through the openings and are linked by circumferential strips to the fixing lugs. They are provided with retaining means adapted to come into bearing engagement against the retaining lugs. The retaining means are part of the rivets which fasten the strips to the tabs, and consist of cantilevered stubs on which axial projections, preferably in the form of radial ribs, may be formed if necessary.

11 Claims, 4 Drawing Figures

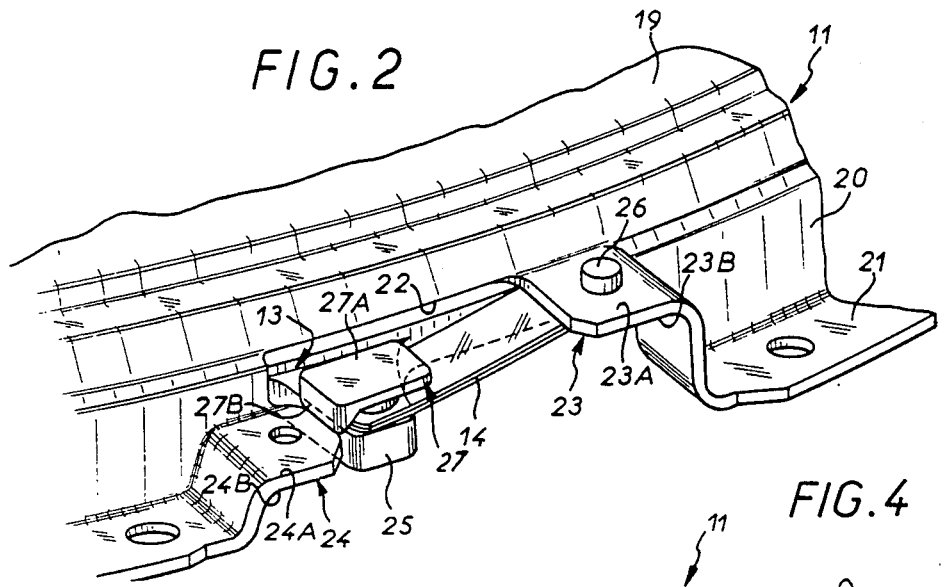
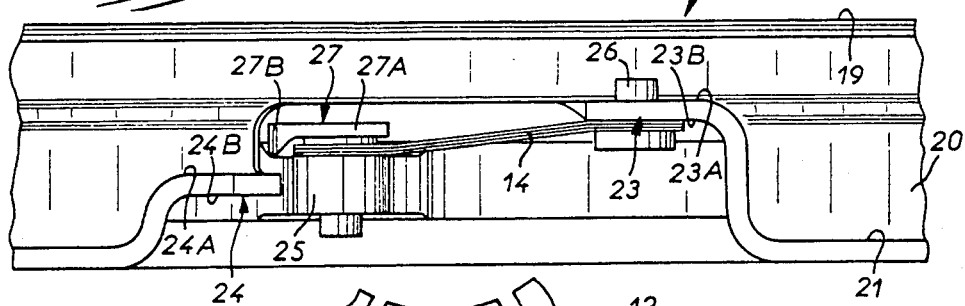
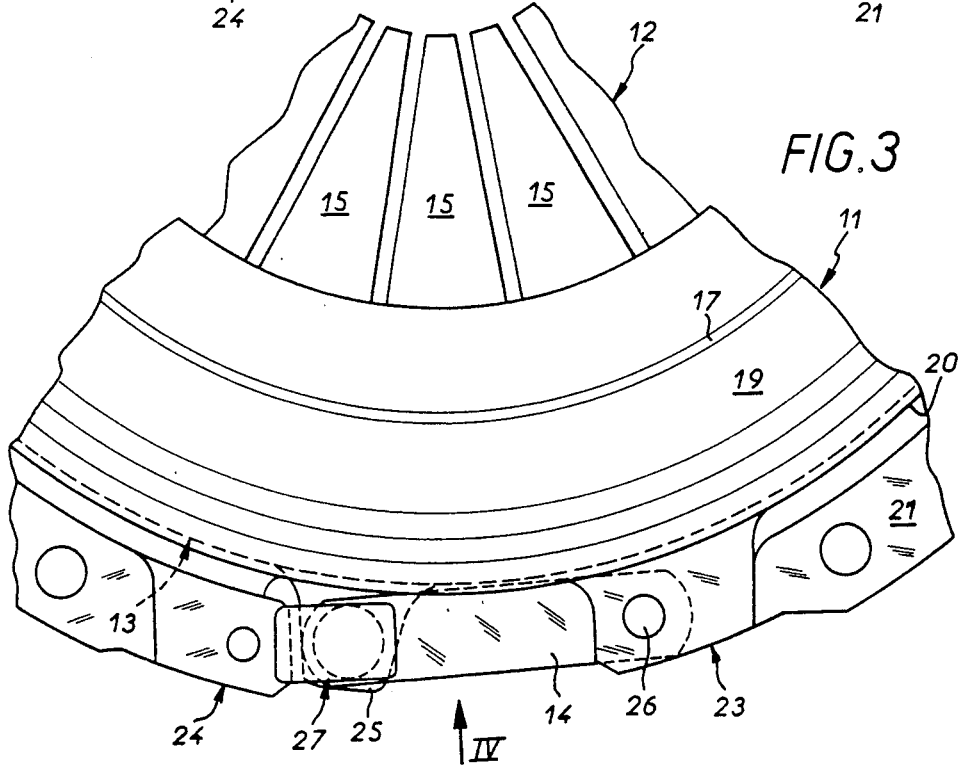

CLUTCH COVER ASSEMBLY

BACKGROUND OF THE INVENTION

1. Field of the Invention

The present invention concerns clutch cover assemblies, for automobile vehicles in particular, of the type comprising a pressure plate equipped with axial retaining means.

2. Description of the Prior Art

As is well known, a clutch cover assembly principally comprises a cover, an engagement member such as a diaphragm spring and at least one pressure plate. The cover, generally hollow, comprises an annular back, a skirt with openings and a flange for fixing the cover to a reaction plate, also called the flywheel, which is generally fastened to a driving shaft, the internal combustion engine output shaft in the case of an automobile vehicle, for example. The pressure plate is designed to be urged away from the back of the cover by the engagement member so as to press on a friction disk fast with a driven shaft and disposed axially between the pressure and reaction plates.

To this end the pressure plate is rotationally coupled to the cover, with provision for relative axial movement between them.

In practice the link between the cover and the pressure plate is provided by axially flexible circumferential strips the respective ends of which are fixed to radially projecting tabs formed on the pressure plate and fixing lugs fast with the cover. The tabs on the pressure plate pass through the skirt of the cover by means of the aforementioned openings and the fixing lugs are disposed in the vicinity of these openings.

A distinction is drawn between two major categories of clutch cover assemblies, according to whether they are adapted to be driven by a motor in one particular direction around their axes or whether they are adapted to be associated with motors turning in either direction.

When both directions are possible, the openings in the cover provide for a substantially diametral plane of symmetry, the openings being bordered in the circumferential direction by two fixing lugs disposed in a common transverse plane, designed for fastening the strips for respective directions of rotation.

A symmetrical configuration of the openings corresponds to relatively large overall dimensions axially, radially and circumferentially. Furthermore, for a number of years there has been an increasingly marked preference for one particular direction of rotation (called the forward direction), to the detriment of the other (the reverse or retrograde direction). Thus there have recently been proposed covers with assymetric openings featuring, inter alia, smaller overall dimensions.

The circumferential strips linking pressure plate and cover are in practice critical to the correct functioning of a clutch cover assembly. These are thin parts, of more or less marked curvature according to the position of the pressure plate relative to the back of the cover, the mechanical specifications of which, in particular with regard to their elasticity, must be such that these strips exert on the pressure plate an axial return force towards the back of the cover which is sufficiently low as not to impede the engagement member (more often than not a diaphragm spring) pressing the pressure plate away from the back of the cover so as to drive through friction, under good conditions, a disk of the aforementioned type, but which is also sufficiently high to provide for the lifting of the pressure plate away from the friction disk when the engagement member releases its pressure on said plate.

To preserve the elastic properties of the strips it is necessary to maintain the axial offsetting of their ends, and thus their curvature, within closely specified limits. In particular, during storage, at which time the cover is not fastened to any reaction plate, it is necessary to avoid the pressure plate being moved away from the back of the cover by the engagement member to the point where it causes unwanted plastic deformation of the strips, as a result of which they become warped.

There have been proposed, as shown for example by French Pat. Nos. 2,342,427 and 2,437,525, covers for clutch cover assemblies with only one rotation direction in which the openings are bordered circumferentially by two lugs offset axially (and circumferentially); the lug which is disposed near the back of the cover is called the fixing lug, while the other lug is called the retaining lug. The latter is intended to serve as a bearing member for the axial retaining means carried by the tabs of the pressure plate so as to prevent excessive displacement of the latter relative to the back of the cover. These retaining means comprise, in the case of the aforementioned patents, for example, a circumferential projection on the strips or a bearing surface formed on the tabs themselves.

These axial retaining means thus necessitate specific adaptations to the cover, the pressure plate or the circumferential links, which are either large or delicate parts; also, these axial retaining means more often than not require conjoint and compatible adaptations of two of the aforementioned parts; the axial position of the retaining lugs on the cover must be very precisely defined, for example. These various factors currently entail a multiplicity of manufacturing ranges and storage problems given the various compatible designs of covers, pressure plates and strips to be provised for.

An object of the invention is to alleviate these disadvantages by providing for enhanced standardisation of the aforementioned parts whilst ensuring good protection of the strips. In accordance with the invention, the axial retaining means are formed on a part which is already present in conventional clutch cover assemblies but which is distinct from the cover, the pressure plate or plates and the circumferential strips: thus the invention does not require these latter items to be "compatible" in the sense explained hereinabove.

SUMMARY OF THE INVENTION

The invention consists in a clutch cover assembly adapted to rotate about an axis of rotation, comprising a hollow cover incorporating an annular back, a skirt formed with openings each bordered in the circumferential direction by a retaining lug and a fixing lug which are offset axially and circumferentially, at least one pressure plate having radially projecting tabs passing through said openings in said skirt, an engagement member adapted to urge said pressure plate in the axial direction away from said back of said cover, and axially flexible circumferential strips attached at their ends by fixing members to said cover and to said pressure plate, respectively via their fixing lugs and their tabs, so as to couple them rotationally with provision for relative axial movement between them, and axial retaining means coupled to said pressure plate to prevent it moving away from said back of said cover by more than a predetermined amount, wherein said axial retaining means are part of said fixing members which fasten said strips to said tabs of said pressure plate and are adapted to abut axially against said retaining lugs of said cover.

The invention specifically provides for the axial retaining means to comprise a cantilevered stub formed at one end of the fixing members which fasten the circumferential strips to the tabs of the pressure plate, especially where these members are rivets. More specifically, they preferably comprise an axial projection, advantageously in the form of a substantially radial rim.

In accordance with the invention the axial retaining means are thus formed on fixing members, in particular on rivets, which are relatively unsophisticated and relatively small parts. These means may feature axial projections of any size, the axial dimension being selected according to the axial position of the retaining lugs. Axial retaining means may thus be implemented with covers of the type proposed in either of the aforementioned patents: in order to replace, for example, the circumferential strips featuring a circumferential projection beyond the tabs, as proposed in French Pat. No. 2 342 427, the projections on the fixing members are advantageously flush with an imaginary plane transverse to the axis of rotation of the clutch cover assembly and passing through the contact surfaces between the tabs of the pressure plate and the associated strips. As an alternative, these projections may extend along said tabs over their entire thickness, without any direct contact between the tabs and the retaining lugs (cf. French Pat. No. 2 437 525).

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 2 is a partial view of it in perspective in the direction of the arrow II in FIG. 1, showing the configuration of the strips for the forward direction.

FIG. 3 is a partial axial view of it in the direction of the arrow III in FIG. 1.

FIG. 4 is a partial radial view of it in the direction of the arrow IV in FIGS. 1 and 3.

DESCRIPTION OF THE PREFERRED EMBODIMENT

Figure 1:
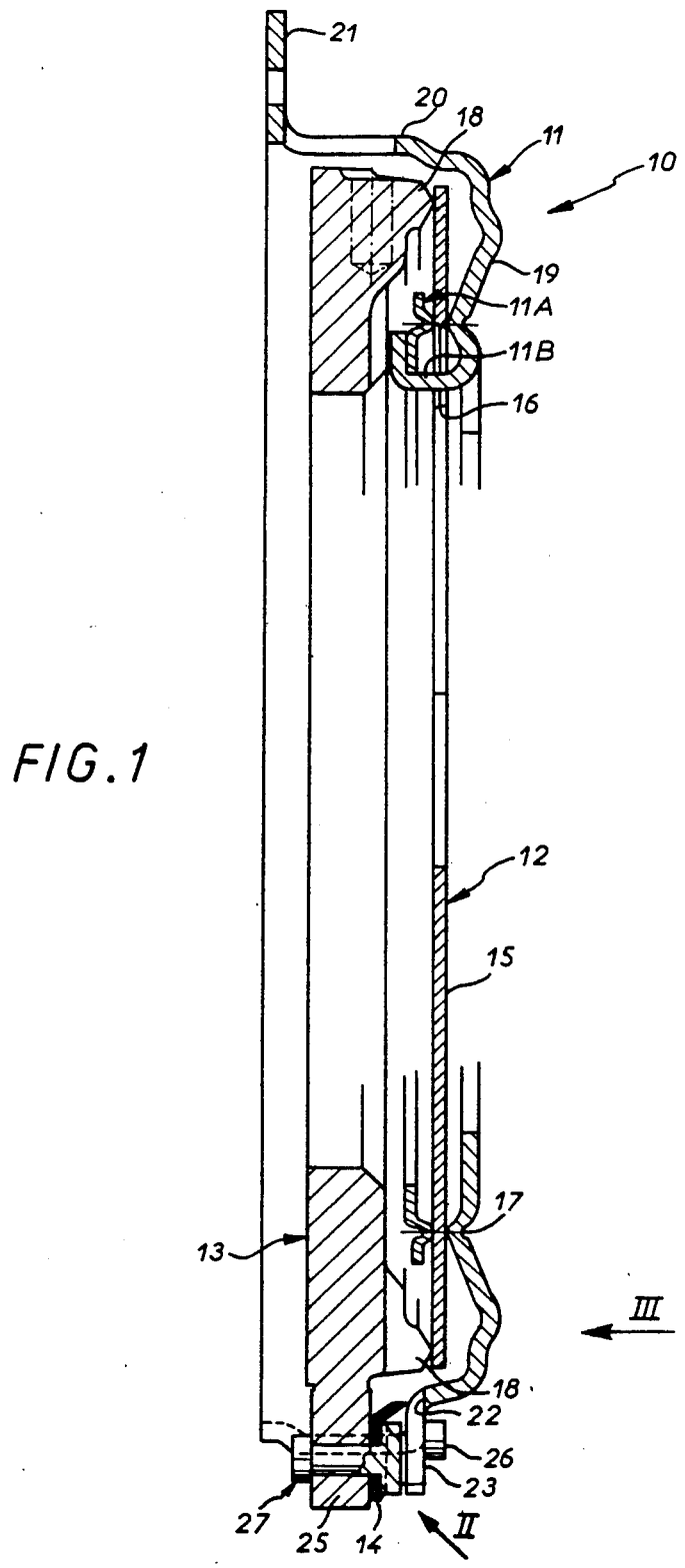
FIG. 1 is diametral axial cross-section through a clutch cover assembly in accordance with the invention.

FIGS. 1 through 4 show by way of example a clutch cover assembly 10 comprising in the conventional manner a hollow cover 11, a diaphragm spring 12 forming an engagement member, a pressure plate 13 and circumferential strips 14 which are axially flexible.

The diaphragm spring 12 comprises an outside peripheral part forming a Belleville spring extended radially inwards by radial fingers 15 separated by slots 16. In the clutch engaged position the peripheral part of the diaphragm spring bears against a rib 17 on the cover and against bosses 18 on the pressure plate disposed at a greater distance from the axis X—X than the rib 17; in the example shown, the clutch cover assembly is of the "push" type. The diaphragm spring is held against the rib 17 by an annular member 11A fixed to the cover by lugs 11B.

The cover principally comprises an annular back 19, a generally axial skirt 20 and a flange 21 for fixing the cover to a reaction flywheel (not shown). The skirt 20 comprises openings 2 bordered circumferentially by lugs 23 and 24 offset axially and circumferentially.

The pressure plate comprises radially projecting tabs 25 each passing through one opening 22 in the skirt 20 of the cover, that is to say offset circumferentially relative to the lugs 24, called retaining lugs, in particular.

The lugs 23 and 24 and the tabs 25 are delimited axially by respective outside transverse surfaces 23A, 24A and 25A facing axially towards the back 19 of the cover and respective inside transverse surfaces 23B, 24B and 25B facing axially away from said back 19.

In the example shown, the strips 14 are fixed to the inside surfaces 23B of the lugs 23, called fixing lugs, by rivets 26 and to the outside transverse surfaces of the tabs 25 by fixing members 27.

In accordance with the invention, the fixing memebers 27 carry axial retaining means which are fast with them and which are designed, by virtue of axial abutment against the retaining lugs 24, to prevent the pressure plate 13 moving away from the back of the cover by more than a predetermined amount.

In the example shown the fixing members 27 (and the members 26) are rivets. The axial retaining means form an integral part of the rivets and are provided on a cantilevered stud 27A which each rivet 27 comprises at its end facing axially towards the back 19 of the cover; the rivet thus comprises a flattened head projecting circumferentially and overlying a retaining lug 24.

The stub 27A preferably comprises an axial projection 27B extending towards said lug 24 and the axial dimension of which delimits axial travel of the pressure plate away from the back of the cover. The rivets are assymetrical by virtue of these axial projections facing the retaining lugs and the cantilevered stubs.

The projection 27B is advantageously a substantially radial rib, of rounded profile, by virtue of which the bearing surface between the stub 27A and the retaining lug 24 is optimised without requiring any increase in the overall radial, axial or circumferential dimensions.

In the example shown in the projections 27B are flush with an imaginary transverse plane passing through the contact surfaces between the tabs 25 and the strips 14. Because of this, the abutment of the axial retaining means 27B against the retaining lugs 24 corresponds to the coincidence in a common transverse plane of the outside surfaces 24A and 25A (facing towards the back of the cover) of the retaining lugs and the tabs, respectively. The invention thus makes it possible to achieve the configuration to which the aforementioned French Pat. No. 2 342 427 is directed with conventional type strips 14. In a variation which is not shown, the projections 27B extend over the entire thickness of the tabs when, by analogy with French Pat. No. 2,437,525, the retaining lugs border the skirt 20 of the cover axially.

It will be understood that various changes in the details, materials and arrangements of parts which have been herein described and illustrated in order to explain the nature of the invention may be made by those skilled in the art within the principle and scope of the invention as expressed in the appended claims. For example, the invention is applicable to multiple disk clutch cover assemblies and the geometry of the fixing members (more often than not but not always rivets) and their axial projections is subject to considerable variation.

Thus the projections on the axial retaining members may be achieved by local stamping of the rivet stub. Also, the axial retaining members may be separate parts fastened to the fixing members, as by welding, for example.

The nature of the engagement member is of little importance: it may be a diaphragm spring or a plurality of coil springs. The invention is equally applicable to clutches of the pull type and clutches of the push type.

There is claimed:

1. A clutch cover assembly adapted to rotate about an axis of rotation, comprising a hollow cover including an annular endwall and a skirt having openings each circumferentially bordered by a retaining lug and a fixing lug, associated ones of said retaining and fixing lugs being axially and circumferentially offset relative to one another, a pressure plate having radially projecting tabs passing through said openings in said skirt, resilient clamping means urging said pressure plate in an axial direction away from said endwall of said cover, axially flexible circumferential straps attached at their ends by fixing members respectively to said fixing lugs on said cover and to said projecting tabs on said pressure plate and coupling said pressure plate for rotation with said cover walls permitting relative axial movement, circumferentially extending axial retaining members for limiting displacement of said pressure plate away from said endwall of said cover to a predetermined distance, and said axial retaining members each being an integral part of said fixing means fixing said straps to said tabs of said pressure plate and adapted to abut axially against said retaining lugs of said cover to limit displacement of said pressure plate.

2. Clutch cover assembly according to claim 1, wherein said fixing members fixing said straps to said tabs are rivets and said axial retaining members comprise circumferentially projecting cantilevered stubs from one end of said rivets, and said cantilevered stubs are cooperable with said retaining lugs.

3. Clutch cover assembly according to claim 2, wherein each of said stubs includes an axial projection directed towards the associated retaining lug for abutment against the associated retaining lug.

4. Clutch cover assembly according to claim 3, wherein a free end of said axial projection is substantially coplanar with a plane along surfaces of contact between said tabs of said pressure plate and the associated straps.

5. Clutch cover assembly according to claim 3, wherein said axial projection is a substantially radial rib.

6. Clutch cover assembly according to claim 1, wherein said fixing lugs and said retaining lugs are portions of a peripheral radial rim of said cover radially projecting from said skirt remote from said endwall, and said radial rim is circumferentially interrupted between associated retaining and fixing lugs.

7. Clutch cover assembly according to claim 1, wherein said retaining lugs are substantially axially aligned with said associated tabs on said pressure plate.

8. Clutch cover assembly according to claim 1, wherein said axial retaining members are disposed axially within the confines of the associated openings in said cover skirt.

9. Clutch cover assembly according to claim 1, wherein said axial retaining members defines substantially radial line of contact with said retaining lug when in abutment therewith.

10. Clutch cover assembly according to claim 1, wherein said axial retaining members extend circumferentially beyond its associated tab relative to its associated fixing lug.

11. Clutch cover assembly according to claim 1, wherein said fixing means fixing said straps to said tabs comprise rivets, and said rivets have circumferentially extending heads with a tapered axial projection cooperable with the associated retaining lug.

* * * * *